(12) United States Patent
Galle et al.

(10) Patent No.: US 9,335,005 B2
(45) Date of Patent: May 10, 2016

(54) MANIFOLD

(71) Applicants: Keith L. Galle, Mount Prospect, IL (US); Michael B. Strozewski, Chicago, IL (US)

(72) Inventors: Keith L. Galle, Mount Prospect, IL (US); Michael B. Strozewski, Chicago, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 13/746,236

(22) Filed: Jan. 21, 2013

(65) Prior Publication Data

US 2014/0202538 A1 Jul. 24, 2014

(51) Int. Cl.
*F16K 11/00* (2006.01)
*F17D 3/00* (2006.01)

(52) U.S. Cl.
CPC ............. *F17D 3/00* (2013.01); *Y10T 137/0318* (2015.04); *Y10T 137/8158* (2015.04)

(58) Field of Classification Search
CPC ......... F16K 11/22; F16K 11/20; F16K 11/10; F17D 3/00; F17D 3/18
USPC ............ 137/594, 597, 861, 887, 884, 599.11, 137/599.13
See application file for complete search history.

(56) References Cited

U.S. PATENT DOCUMENTS

| | | | | |
|---|---|---|---|---|
| 6,079,443 A | * | 6/2000 | Hutton | 137/597 |
| 6,349,735 B2 | * | 2/2002 | Gul | 137/15.09 |
| 2001/0039964 A1 | * | 11/2001 | Gul | 137/360 |
| 2002/0174905 A1 | * | 11/2002 | Latino et al. | 137/884 |
| 2007/0045160 A1 | * | 3/2007 | Prescott et al. | 210/87 |
| 2007/0063164 A1 | * | 3/2007 | Torii et al. | 251/308 |
| 2010/0089456 A1 | * | 4/2010 | Lowery | 137/1 |
| 2010/0229959 A1 | * | 9/2010 | Boyer | 137/116.3 |
| 2011/0168285 A1 | * | 7/2011 | Seabolt | 137/884 |

* cited by examiner

*Primary Examiner* — Jessica Cahill

(57) ABSTRACT

A system and method for a fluid manifold with a sensor inlet and sensor outlet located on the same side of the body of the fluid manifold.

12 Claims, 3 Drawing Sheets

MANIFOLD

FIELD OF THE INVENTION

This application relates to the field of heating, ventilation and air condition (HVAC) systems, and more particularly to manifolds for use in HVAC systems.

BACKGROUND

Traditionally, manifolds have been used in HVAC systems in many different ways. One such way is for the placement of sensors, such as pressure sensors in an HVAC system. A problem exists with known manifolds that have inlets and outlets on opposite sides. The placement of the inlets and outlets on a traditional manifold limit the placement of the manifolds when deployed in an HVAC system. Traditional manifolds also require adequate space for the piping connecting to the inlet and outlet that are opposite one another. Another problem with traditional manifolds that are commonly found in HVAC systems, is the additional pipe required to make connections on two sides of a manifold. This additional piping results in additional cost.

While traditional manifold systems have been used in HVAC systems, a need exists for a manifold that overcomes the known problems.

SUMMARY

In accordance with one embodiment of the disclosure, there is provided an approach for a manifold that has input and output ports located on the same side of the manifold.

The above described approaches and advantages of the present invention, as well as others, will become more readily apparent to those of ordinary skill in the art by reference to the following detailed description and accompanying drawings. While it would be desirable to have a manifold that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DESCRIPTION

Figure 1:
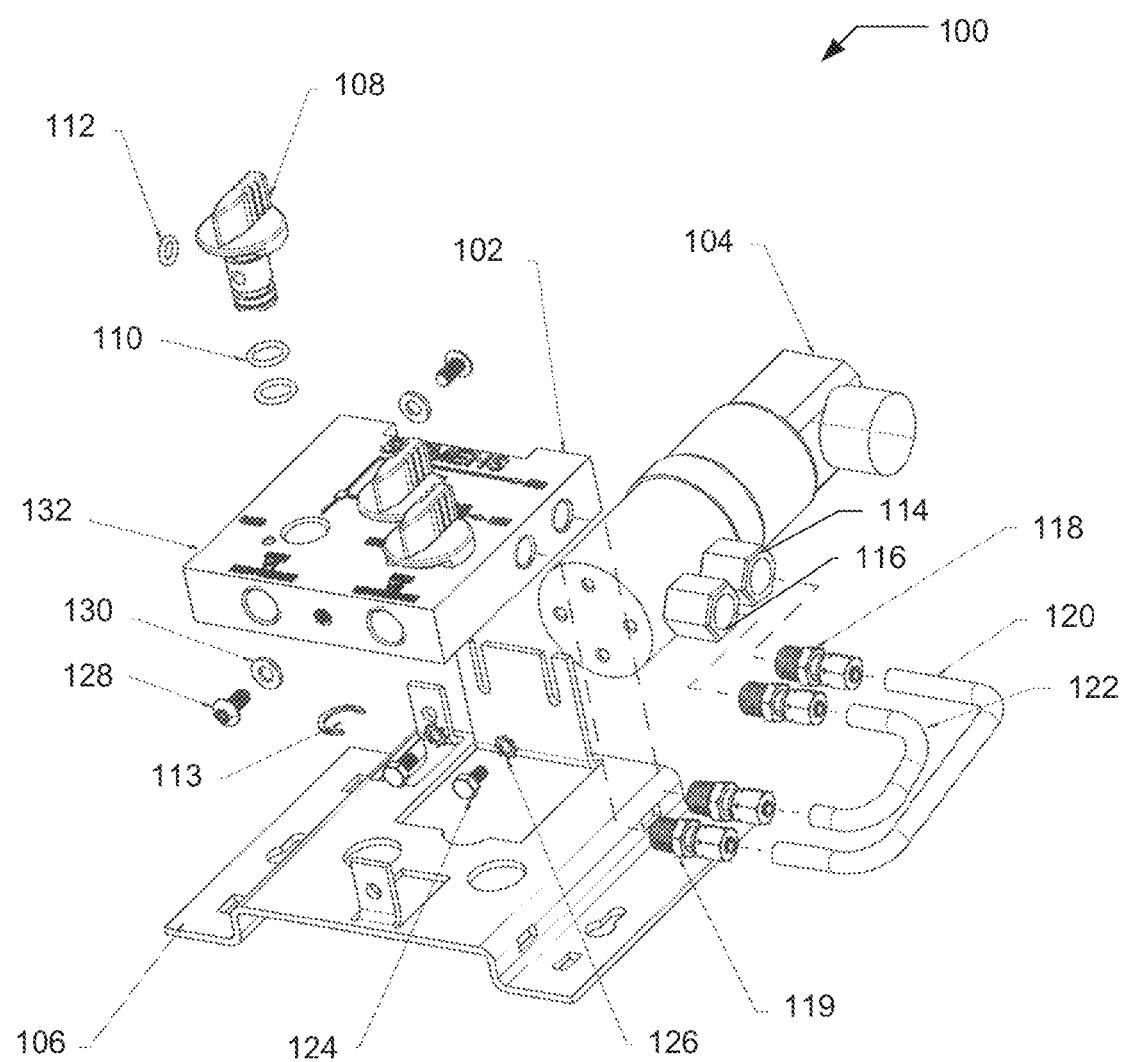
FIG. 1 shows a perspective diagram of a fluid manifold with an associated sensor and bracket according to an example implementation of the invention.

With reference to FIG. 1, a perspective diagram 100 of a fluid manifold 102 with an associated sensor 104 and bracket 106 according to an example implementation of the invention is depicted. The fluid manifold 102 may have multiple knobs, such as 108. The knobs may be formed from a material that is resistant to the type of fluid passing through the fluid manifold 102. In the current example, FORTRON™ 1140 L4 Polyphenylene Sulfide (PPS) with 40% glass fiber is employed from TICONA. Each knob, such as knob 108 may have multiple seals 110, 112. The seals 110 and 112 may also be formed from material that is resistant to type of fluid passing through the fluid manifold 102. The knobs may be held in the fluid manifold 102 via a clip 113.

The sensor 104 may be a pressure sensor or other type of transducer that transmits data about the fluid flowing through the fluid manifold 102. An example of the sensor that may be used is SIEMENS QBE3100UD25, QBE3100UD50, and QBE3100UD100. The sensor may have two fluid connectors, such as 114, 116. Compression fittings, such as 118, may be used to connect the sensor 104 to copper pipes 120 and 122. In the current example, copper pipes 120 and 122 are used, but in other implementations the pipes 120 and 122 may be composed of different materials and may be dependent upon the type of fluid that passes through the pipes 120 and 122. The pipes on the side of the fluid manifold 104 may also have compression fittings 119 similar to 118. The compression fittings compress to seal around the pipes 120 and 122 and have threads to screw into the sensor 104 and manifold 102.

The sensor 104 may attach to the bracket 106 with a pair of bolts and washers, such as bolt 124 and lock washer 126. Similarly, the fluid manifold 102 may be attached to the bracket 106 with a pair of bolts and washers, such as bolt 128 and washer 130. The bracket 106 may be affixed to a wall or other support prior to mounting the fluid manifold 102 and sensor 104. In other implementations, the bracket 106 may be mounted using tire-wraps, screws or other fasteners. In yet other implementations, the bracket may only secure the fluid manifold 102 or the sensor 104 rather than both as shown in FIG. 1.

The shape of the knobs may have an elongated portion and ribs to assist in grasping and turning the knobs. The knobs may also have an indicator shape or marking that enables a person to identify the direction that the knob faces. To further aid in use of the fluid manifold, a graphic overlay 132 may be affixed to the fluid manifold 102. In other implementations, multiple graphics may be affixed or painted onto the fluid manifold 102. In yet other implementations, the graphics may be formed in the material that the fluid manifold is formed from (i.e. by etching or casting).

The advantage of the fluid manifold 102 may be seen in FIG. 1 with the pipes 120 and 122 being attached to the same side of the fluid manifold 102. The routing of the pipes 120 and 122 require less material than if the pipe connections were on opposite sides of the fluid manifold 102. Furthermore, items only attach on two sides of the fluid manifold 102 allowing the fluid manifold to be placed in areas with limited space.

Figure 2:
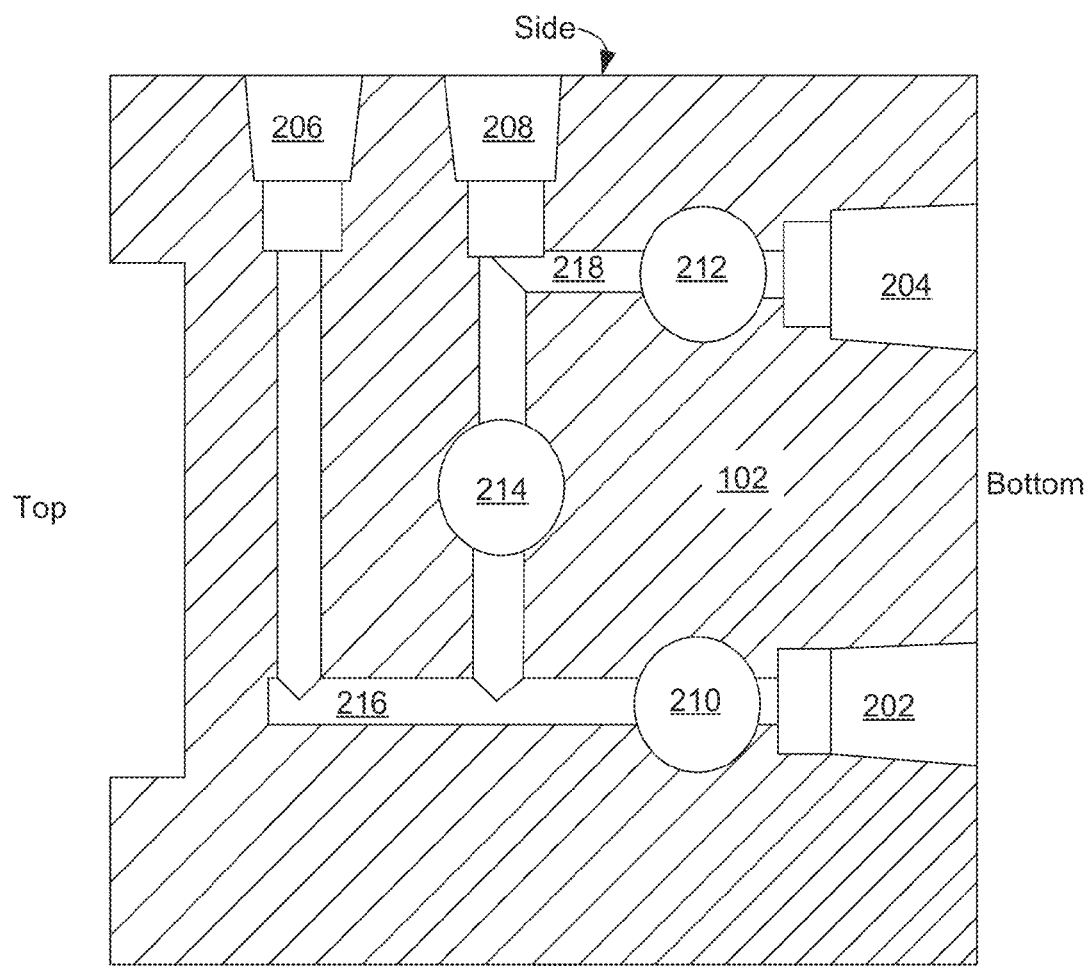
FIG. 2 shows a cut-away view of the fluid manifold of FIG. 1 as viewed from the above in accordance with an example implementation.

Turning to FIG. 2, a cut-away view of the fluid manifold 102 of FIG. 1 as viewed from above in accordance with an example implementation is shown. A pipe that carries fluid may be connected via a connector with threads to inlet 202 that is defined by the fluid manifold 102. A first knob may control the flow of fluid through a first knob area 210 into the fluid manifold's channel 216. The fluid flow is typically under "high" pressure in the fluid manifold's channel 216. The fluid may pass through the fluid manifold 102 to a sensor outlet 206 that is defined by the fluid manifold 102. The "high pressure" fluid would dead-end at the pressure sensor 104 inlet 116 of FIG. 1. A pipe that carries fluid may be connected via a connector with threads to inlet 204 that is defined by the fluid manifold 102. A second knob may control the flow of fluid through a second knob area 212 into the fluid manifold's channels 218. The fluid flow in the fluid manifold's channels 218 is typically under "low" pressure. The fluid may pass through the fluid manifold 102 to a sensor outlet 208 that is defined by the fluid manifold 102. The "low" pressure fluid would dead-end at the pressure sensor 104 inlet 114 of FIG. 1. All of the inlets and outlets may have threads to receive fittings and connectors, such as compression fitting 118. A third knob area 214 and associated knob may be used to disconnect or equalize or balance the pressure in the fluid manifold if knob area 212 and 210 have their associated knobs set to a closed position (210 off, 214 on, and 212 off).

Figure 3:
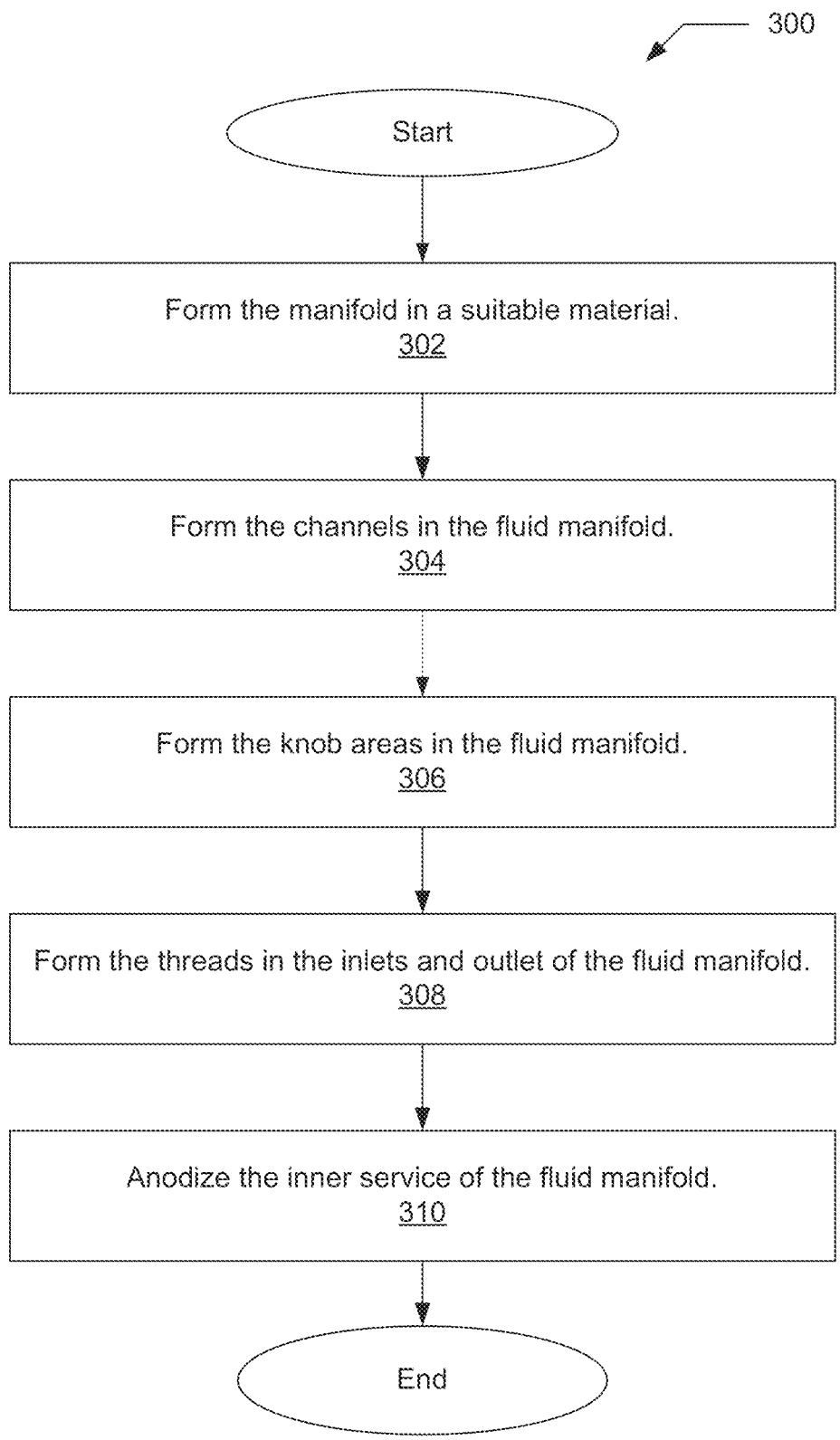
FIG. 3 shows a flow diagram of the steps for forming the channels of FIG. 2 in the fluid manifold in accordance with an example implementation.

In FIG. 3, a flow diagram 300 of the steps for forming the channels 216 and 218 of FIG. 2 in the fluid manifold in accordance with an example implementation. A block of material, such as aluminum may be formed into the general shape of the body of the fluid manifold 102 of FIG. 2 (step 302). The forming may be accomplished by an additive process such as casting or by a subtractive process such as milling. The channels may be formed in the fluid manifold by machining (drilling) the channels (step 304). The knob areas (210-214 of FIG. 2) may be machined into the aluminum (Step 306). The threads in the inlets and outlets (202-208) may be machined into the fluid manifold (Step 308). Depending upon the implementations, the inner surface of the fluid manifold may be anodized (step 310) to further protect the fluid manifold from the fluid that passes through it. In other implementations, the fluid manifold may be completely anodized. In other implementations, a bleed screw may be used to release pressure in the fluid manifold 102.

The foregoing detailed description of one or more embodiments of the fluid manifold has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A fluid manifold, comprising:
  a body;
  a first sensor outlet;
  a second sensor outlet located on the same side of the body as the first sensor outlet that is adapted to connect to a sensor with the first and second sensor outlets connected by a channel; and
  a plurality of knobs that in a first position allow fluid to flow to the first sensor outlet from a first inlet and in a the second sensor outlet from a second inlet, and in a second position between the first sensor inlet and the second sensor inlet, wherein a first knob fits into the body to control the flow in a first channel and a second knob fits into the body to control the flow in a second channel and a third knob fits into the body to control the flow between the first channel and the second channel, and where the first knob divides the first channel, the second knob divides the second channel, where the plurality of knobs have at least the first knob, the second knob and the third knob, wherein the first knob, the second knob, and the third knob are all on the same side of the body.

2. The fluid manifold of claim 1, where the plurality of knobs are in the second position when pressure between the sensor inlet and the sensor outlet are equalized.

3. The fluid manifold of claim 1, where the plurality of knobs are formed from Polyphenylene Sulfide.

4. The fluid manifold of claim 1, where the first inlet and the second inlet further includes threads.

5. The fluid manifold of claim 1, where the first sensor outlet and the second sensor outlet further includes threads.

6. The fluid manifold of claim 1, where the body is formed from aluminum.

7. The fluid manifold of claim 6, where the first channel and the second channel are anodized.

8. A fluid manifold system comprising:
  a manifold having a first inlet and a second inlet and a first sensor outlet and a second sensor outlet along with channels and a plurality of knobs where a first knob fits into the manifold to control the flow in a first channel and a second knob fits into the manifold to control the flow in a second channel and a third knob fits into the manifold to control the flow between the first channel and the second channel, and where the first knob divides the first channel, the second knob divides the second channel, wherein the first knob, the second knob, and the third knob are all on the same side of the manifold; and
  a sensor coupled to the first sensor outlet and the second sensor outlet, where the first sensor outlet is located on the same side of the manifold as the second sensor outlet.

9. The fluid manifold system of claim 8, where the manifold has an anodized interior surface.

10. The fluid manifold system of claim 8, wherein the third knob is an equalization knob for equalizing pressure between the first inlet and the second inlet when the knob is in a first position.

11. The fluid manifold system of claim 10, where the equalization knob further includes a plurality of ribs.

12. The fluid manifold system of claim 10, where the equalization knob is formed from Polyphenylene Sulfide.

* * * * *